United States Patent
Bitragunta et al.

(10) Patent No.: US 10,989,252 B2
(45) Date of Patent: Apr. 27, 2021

(54) CLUTCH CARRIER ASSEMBLY FOR A TRANSMISSION

(71) Applicant: Schaeffler Technologies AG & Co. KG, Herzogenaurach (DE)

(72) Inventors: Venkata Sivaram Bitragunta, Wooster, OH (US); Rolf Mueller, Wooster, OH (US); Charles Schwab, Fort Mill, SC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 133 days.

(21) Appl. No.: 16/368,919

(22) Filed: Mar. 29, 2019

(65) Prior Publication Data

US 2020/0309202 A1    Oct. 1, 2020

(51) Int. Cl.
  *F16D 13/76*    (2006.01)
  *F16H 55/17*    (2006.01)
  *F16D 13/72*    (2006.01)
  *F16D 13/70*    (2006.01)

(52) U.S. Cl.
  CPC ............. *F16D 13/76* (2013.01); *F16D 13/70* (2013.01); *F16D 13/72* (2013.01); *F16H 55/17* (2013.01); *F16H 2055/176* (2013.01); *F16H 2055/178* (2013.01)

(58) Field of Classification Search
  CPC ............... F16H 55/17; F16H 2055/176; F16H 2055/178; F16H 13/76
  See application file for complete search history.

(56) References Cited

U.S. PATENT DOCUMENTS

| | | | | |
|---|---|---|---|---|
| 4,945,782 A | * | 8/1990 | Farrell | F16D 25/0638 192/70.2 |
| 7,819,774 B2 | * | 10/2010 | Haupt | F16D 13/644 475/331 |
| 9,121,456 B2 | * | 9/2015 | Luipold | F16D 41/06 |
| 2008/0257678 A1 | * | 10/2008 | Ari | F16D 13/683 192/112 |
| 2010/0137096 A1 | * | 6/2010 | Illerhaus | F16D 13/683 475/331 |
| 2013/0091708 A1 | * | 4/2013 | Paelicke | F16H 57/08 29/893.1 |

* cited by examiner

Primary Examiner — Stacey A Fluhart
(74) Attorney, Agent, or Firm — LeKeisha M. Suggs

(57) ABSTRACT

A clutch carrier assembly for a transmission is disclosed that comprises a clutch carrier and a ring gear carrier. The clutch carrier includes a plurality of tabs and the ring gear carrier includes a plurality of openings defined in, and extending through, an outer surface. The ring gear carrier is disposed within the clutch carrier. Each of the tabs is received within a corresponding one of the openings such that the ring gear carrier and the clutch carrier are held together.

14 Claims, 5 Drawing Sheets

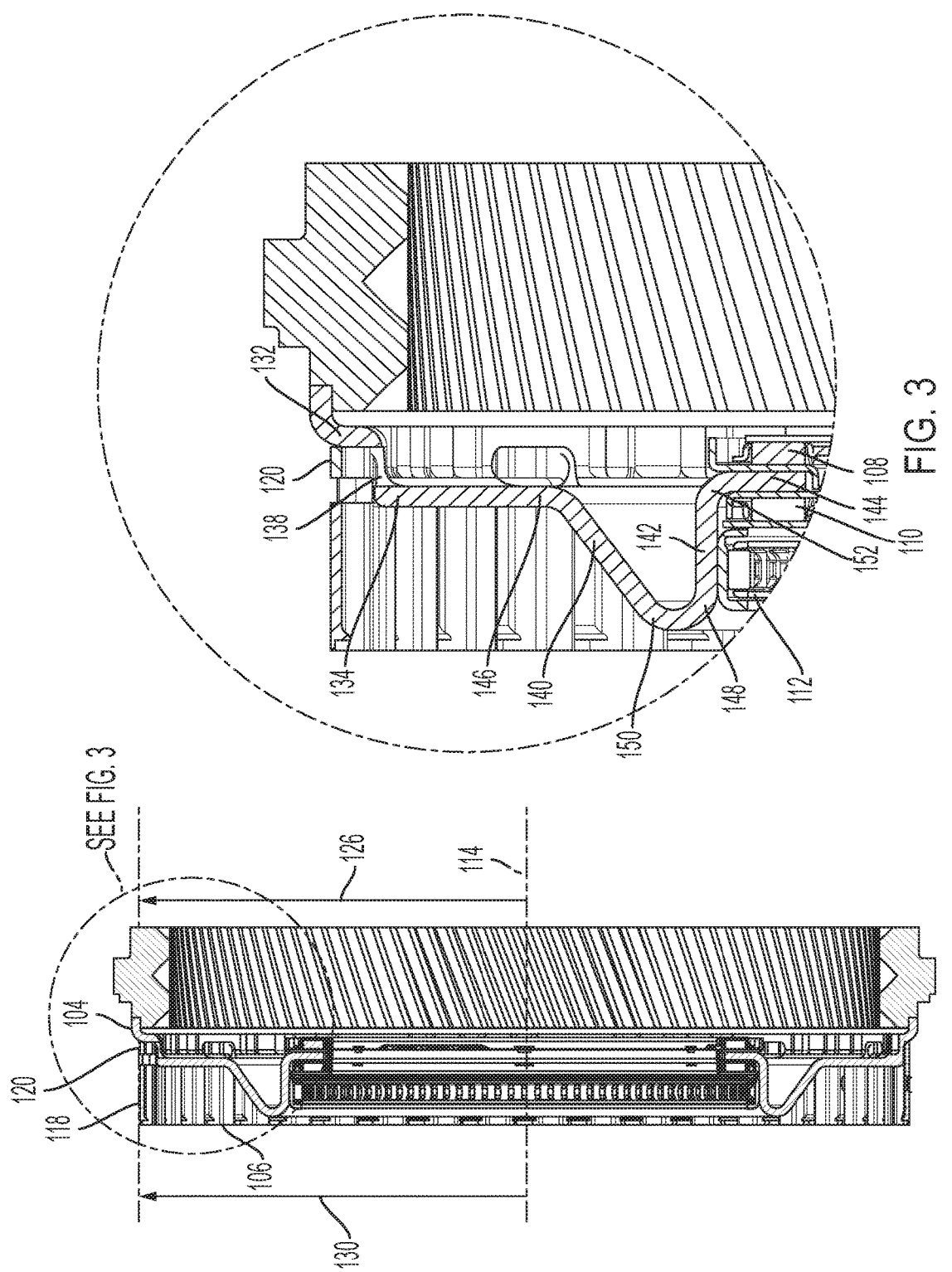

CLUTCH CARRIER ASSEMBLY FOR A TRANSMISSION

TECHNICAL FIELD

The present disclosure relates to clutch carrier assemblies for a transmission.

BACKGROUND

In general, clutch carriers for vehicle transmissions are known.

SUMMARY

According to one embodiment, a clutch carrier assembly is provided that includes a ring gear carrier and a clutch carrier. The ring gear carrier includes a plurality of openings defined in an outer surface and extending therethrough. The clutch carrier circumscribes the ring gear carrier and includes a plurality of formable tabs, wherein each tab is configured to be disposed within a corresponding one of the openings when pressed radially inward. In one embodiment, the ring gear carrier further includes a first radial wall and a second radial wall connected to the first radial wall by the outer surface, wherein the formable tabs are arranged to contact the first radial wall. In other embodiments, the ring gear carrier further comprises: a conical portion extending from a radially inner end of the second radial wall; a tubular section with a first distal end extending from a radially inner end of the conical portion; and a third radial wall extending radially inward from a second distal end of the tubular section, opposite the first distal end. The clutch carrier assembly may further include a radial bearing arranged to contact the tubular section; a first axial bearing disposed on a first side of the third radial wall; and a second axial bearing disposed on a second side, opposite the first side, of the third radial wall. The first axial bearing may be disposed between the radial bearing and the third radial wall.

In other embodiments, each of the formable tabs includes an unformed diameter, a formed diameter when the formable tabs are pressed radially inward, and the formed diameter is less than the unformed diameter. In some embodiments, the unformed diameter is equal to a diameter of an outer surface of the clutch carrier. In other embodiments, the formed diameter is less than a diameter of an outer surface of the clutch carrier. In embodiments, the clutch carrier includes a plurality of holes arranged for a cooling oil flow.

According to another embodiment, a clutch carrier assembly for a transmission includes a clutch carrier including a plurality of tabs and a ring gear carrier including a plurality of openings defined in an outer surface and extending therethrough. The ring gear carrier is disposed within the clutch carrier and each of the tabs is received within a corresponding one of the openings such that the ring gear carrier and the clutch carrier are held together. In embodiments, each tab may include a diameter that is less than a diameter of a radially outer surface of the clutch carrier. In embodiments, each of the tabs may be arranged to contact a radial wall of the ring gear carrier. In other embodiments, the assembly includes a first axial bearing fixed on a first axial side of the ring gear carrier and a second axial bearing fixed on a second axial side, opposite the first axial side, of the ring gear carrier. The assembly may further include a radial bearing disposed radially within the ring gear carrier and supported on an inner surface of the ring gear carrier. The radial bearing may be arranged to contact the first or the second axial bearings.

According to another embodiment, a method of assembling a clutch carrier for a transmission is provided. The method includes positioning a ring gear carrier within a clutch carrier. The ring gear carrier includes a plurality of openings extending therethrough and the clutch carrier includes a plurality of formable tabs. The method further includes aligning each formable tab of the clutch carrier with one of the openings in the ring gear carrier and pressing each formable tab in a radially inward direction such that a portion of each formable tab is received within a corresponding one of the openings of the ring gear carrier.

BRIEF DESCRIPTION OF THE DRAWINGS

FIG. 2 shows a cross-sectional view of the clutch carrier assembly of FIG. 1.

FIG. 3 shows an enlarged view of the clutch carrier assembly shown in FIG. 2.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein should be understood to be referring to the orientation of the structure depicted in the figures. If an object is said to be extending about an axis, then terms such as "radial" and "axial" are relative to the axis. For example, the "axial" direction is one along or parallel to an axis such as a central axis, and the "radial" direction is normal to the axial direction. An "axial" surface is a surface extending at least partially in the radial direction but located at a particular axial point along the axis. Likewise, a "radial" surface is a surface extending at least partially in the axial direction but located at a particular radial distance from the axis. "Inner" and "outer" also are relative to the axis; for example, an "inner surface" may be a surface facing the axis, and an "outer surface" may be a surface facing away from the axis. Rotation can be relative to the axis. These terms can be used as explained above unless otherwise noted.

Figure 1:
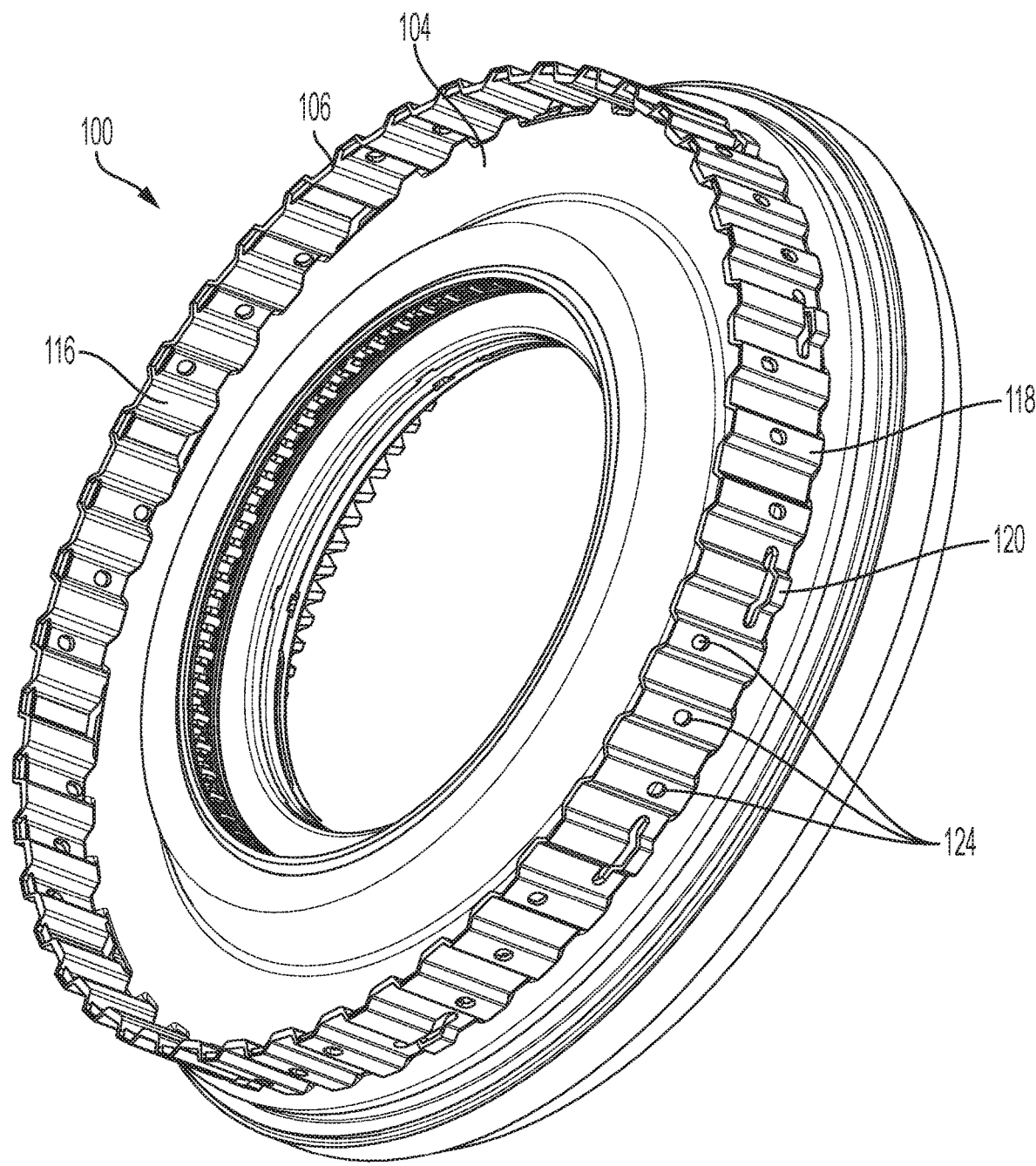
FIG. 1 shows a perspective view of a clutch carrier assembly with unformed tabs according to embodiments of the present disclosure.
Figure 4:
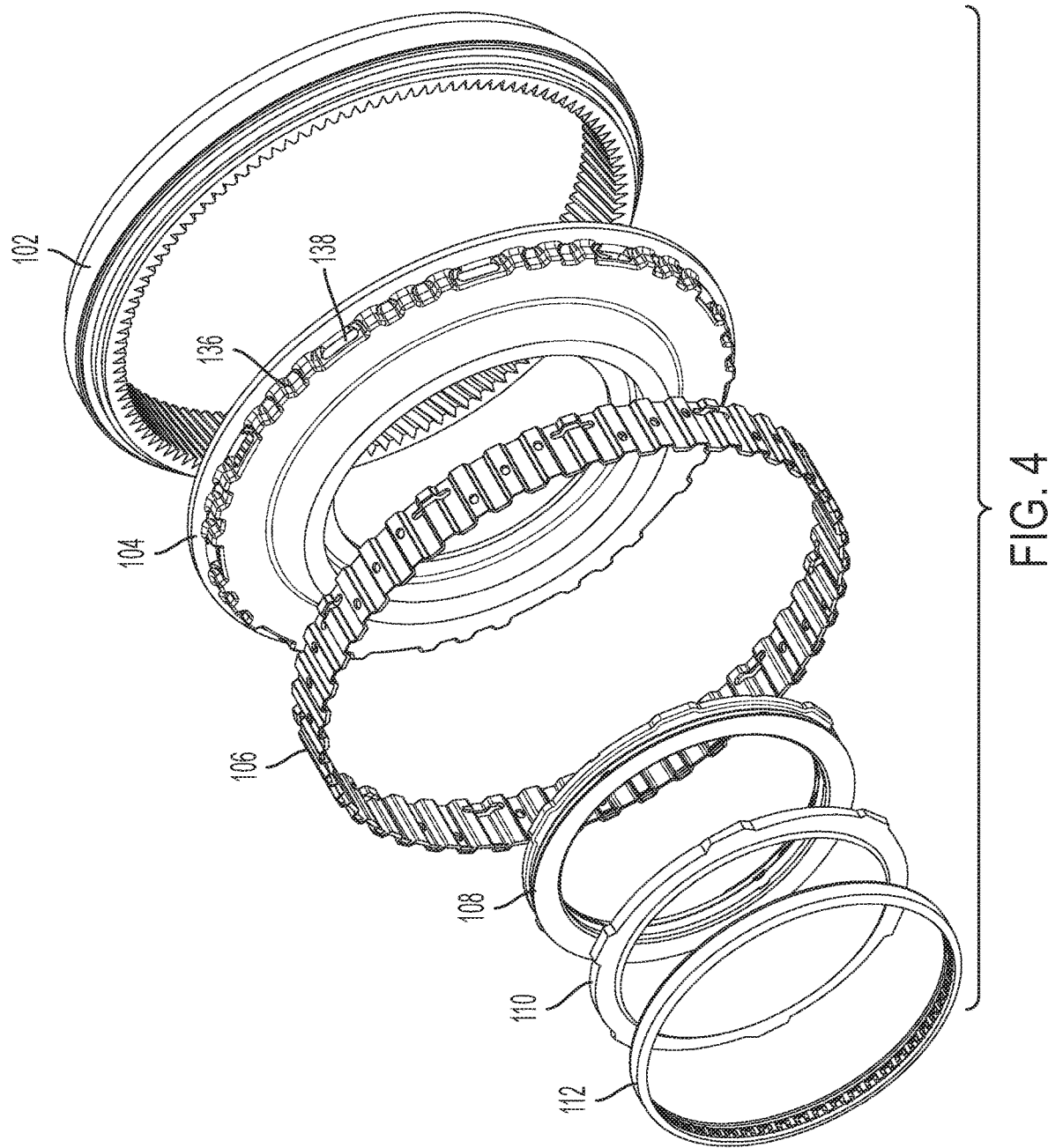
FIG. 4 shows an exploded view of the clutch carrier assembly of FIG. 1.

The following description is made with reference to FIGS. 1-4. FIG. 1 shows a clutch carrier assembly 100 with unformed tabs according to embodiments of the present disclosure. FIG. 2 shows a cross-sectional view of the clutch carrier assembly 100 of FIG. 1. FIG. 3 shows an enlarged view of the clutch carrier assembly 100 shown in FIG. 2. FIG. 4 shows an exploded view of the clutch carrier assembly of FIG. 1.

Clutch carrier assembly 100 includes ring gear 102, ring gear carrier 104, clutch carrier 106, thrust bearings 108, 110, radial bearing 112, and central axis 114. Ring gear carrier 104 and clutch carrier 106 may be formed from a single piece of material. For example, ring gear carrier 104 and clutch carrier 106 may be stamped from sheet metal. Clutch carrier assembly 100 may be a clutch carrier assembly for a transmission. Clutch carrier 106 includes radially inner surface 116 and radially outer surface 118 for mating engagement with a clutch plate spline (not shown). That is, a plurality of clutch plates for a clutch pack may be engaged with the clutch carrier to transfer torque to or from the clutch carrier when the clutch is engaged. Clutch carrier 106 includes formable tabs 120 that are configured to be pressed radially inwardly toward central axis 114 for holding ring gear carrier 104 and clutch carrier 106 for assembly. Formable tabs 120 include an unformed (not pressed in) diameter 126 (see FIG. 2) and a formed (pressed in) diameter 128 (see FIG. 6). Formed diameter 128 is less than unformed diameter 126. That is, the diameter of formable tab 120 pressed in is less than the diameter of formable tab 120 prior to being pressed in. Moreover, unformed diameter 126 is equal to a diameter 130 of clutch carrier radially outer surface 118 and formed diameter 128 is less than the diameter 130 of clutch carrier radially outer surface 118.

Clutch carrier 106 further includes holes 124 for a cooling oil flow (not shown). That is, during operation, it may be desirable for some amount of a transmission oil to flow through the clutch pack (not shown) to keep the plates cool during engagement or slipping conditions. Holes 124 allow a radial flow of oil from inside the clutch carrier through the clutch plates. Holes 124 are axially and circumferentially offset to ensure an adequate flow to each of the clutch plates.

Ring gear carrier 104 includes radial wall 132 and radial wall 134 connected by circumferential surface 136. Slots or openings 138 are defined in circumferential surface 136. Clutch carrier 106 circumscribes ring gear carrier 104 such that ring gear carrier slots 138 align with clutch carrier formable tabs 120. The clutch carrier is assembled by aligning ring gear carrier slots 138 with clutch carrier formable tabs 120 and then pressing formable tabs 120 radially inward into slots 138. That is, formable tabs 120 when pressed in hold ring gear carrier 104 and clutch carrier 106 together. The formable tabs 120 allow assembly without additional components.

Ring gear carrier 104 further includes conical portion 140, tubular section 142 and radial wall 144. The conical portion extends from radially inner end 146 of radial wall 134. The tubular section 142 includes distal end 148 extending from radially inner end 150 of the conical portion 140. Radial wall 144 extends radially inward from distal end 152 of the tubular section 142. Distal end 152 is opposite distal end 148.

Clutch carrier assembly 100 includes axial bearing 108, axial bearing 110, and radial bearing 112 for radially and axially centering ring gear carrier 104. In one embodiment, the bearings 108, 110, 112 are fixed to ring gear carrier 104. Axial bearings 108, 110 may be disposed on axial opposite sides of radial wall 144 of ring gear carrier 104. Moreover, tubular section 142 of ring gear carrier 104 may be supported on radial bearing 112. Axial bearing 108 or axial bearing 110 may be disposed between radial bearing 112 and radial wall 144 of ring gear carrier 104.

Figure 5:
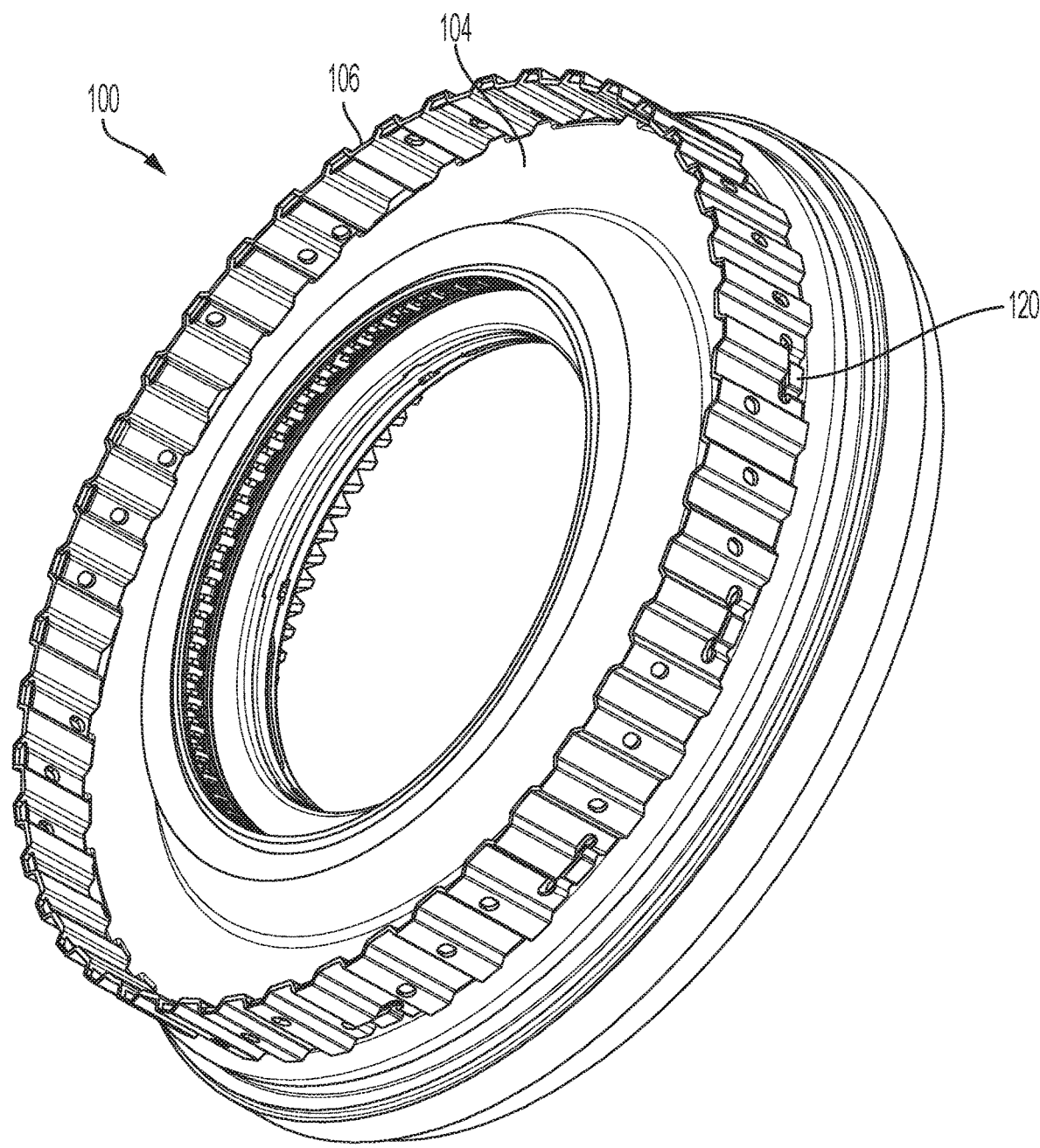
FIG. 5 shows a perspective view of the clutch carrier assembly of FIG. 1 with formed tabs according to embodiments of the present disclosure.
Figure 7:
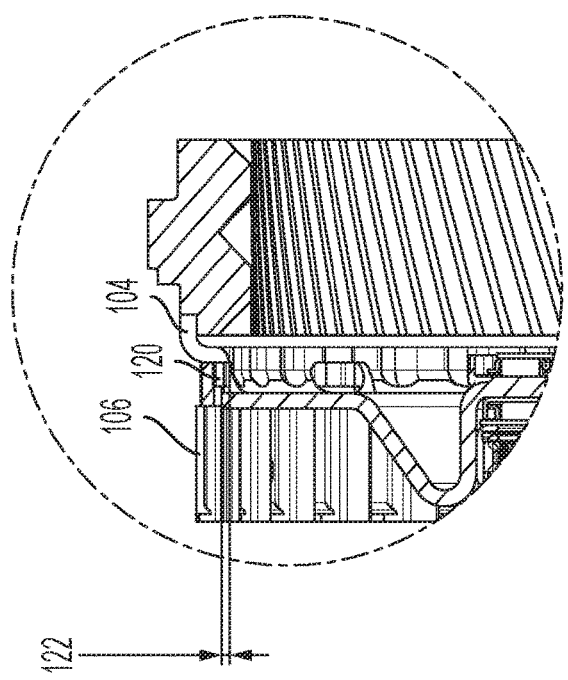
FIG. 7 shows an enlarged view of the clutch carrier assembly shown in FIG. 6.
Figure 6:
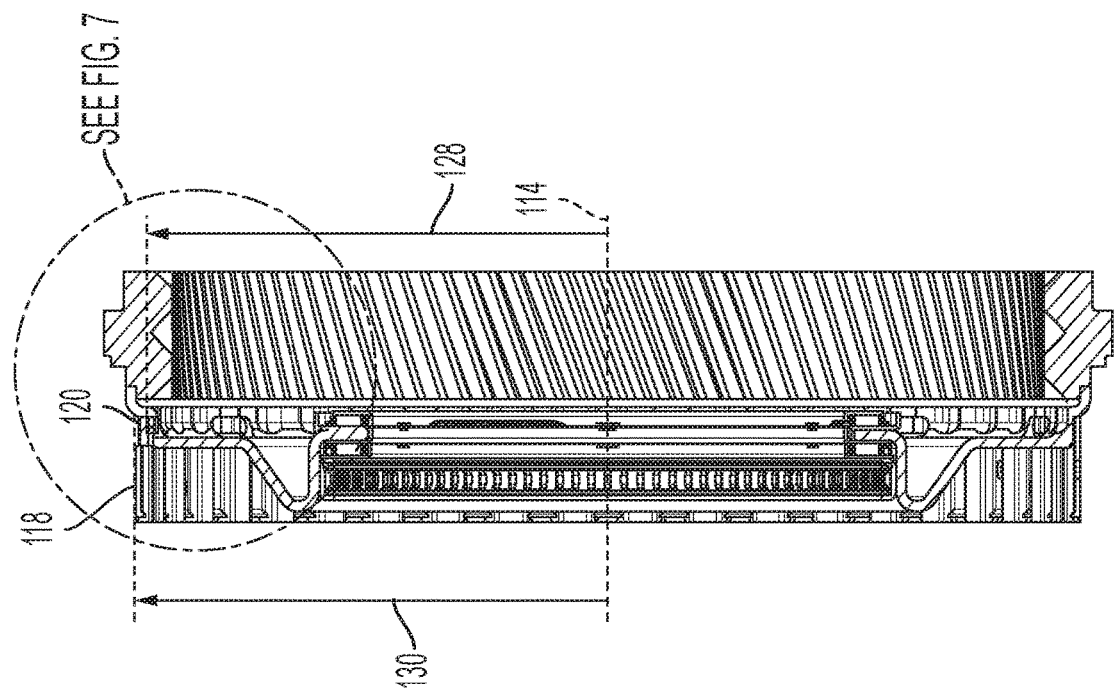
FIG. 6 shows a cross-sectional view of the clutch carrier assembly of FIG. 5.

The following description is made with reference to FIGS. 5-7. FIG. 5 shows the clutch carrier assembly 100 of FIG. 1 with formed tabs that are pressed in to hold the ring gear carrier 104 and clutch carrier 106 together. FIG. 6 shows a cross-sectional view of the clutch carrier assembly of FIG. 5. FIG. 7 shows an enlarged view of the clutch carrier assembly shown in FIG. 6.

As shown in the figures, formable tabs 120 are pressed radially inward toward axis 114 such that each tab 120 is at least partially received within a corresponding slot or opening 138 of ring gear carrier 104. A portion 122 of each tab 120 is disposed within or passes through slot or opening 138 to hold ring gear carrier 104 and clutch carrier 106 together for assembly. Each formable tab 120 is arranged to contact radial wall 132 of ring gear carrier 104.

Embodiments disclosed herein provide several advantages such as assembly of the clutch carrier without additional components, radial and axial centering of the ring gear, and simpler methods of holding the ring gear carrier and clutch carrier together for assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 clutch carrier assembly
102 ring gear
104 ring gear carrier
106 clutch carrier
108 axial bearing
110 axial bearing 112 radial bearing
114 central axis
116 inner surface
118 radially outer surface
120 formable tabs
122 portion
124 holes
126 unformed diameter
128 formed diameter
130 diameter
132 radial wall
134 radial wall
136 circumferential surface
138 slots or openings
140 conical portion
142 tubular section
144 radial wall
146 inner end
148 distal end
150 inner end
152 distal end

What is claimed is:

1. A clutch carrier assembly for a transmission, comprising:
a ring gear carrier including a plurality of openings defined in an outer surface and extending therethrough; and
a clutch carrier circumscribing the ring gear carrier and including a plurality of formable tabs, wherein each tab is configured to be disposed within a corresponding one of the openings when pressed radially inward, wherein the ring gear carrier further includes a first radial wall and a second radial wall connected to the first radial wall by the outer surface, wherein the formable tabs are arranged to contact the first radial wall.

2. The clutch carrier assembly of claim 1, wherein the ring gear carrier further comprises:
a conical portion extending from a radially inner end of the second radial wall;
a tubular section with a first distal end extending from a radially inner end of the conical portion; and
a third radial wall extending radially inward from a second distal end of the tubular section, opposite the first distal end.

3. The clutch carrier assembly of claim 2, further comprising:
a radial bearing arranged to contact the tubular section;
a first axial bearing disposed on a first side of the third radial wall; and
a second axial bearing disposed on a second side, opposite the first side, of the third radial wall.

4. The clutch carrier assembly of claim 3, wherein the first axial bearing is disposed between the radial bearing and the third radial wall.

5. The clutch carrier assembly of claim 1, wherein each of the formable tabs includes:
an unformed diameter;
a formed diameter when the formable tabs are pressed radially inward; and
the formed diameter being less than the unformed diameter.

6. The clutch carrier assembly of claim 5, wherein the unformed diameter is equal to a diameter of an outer surface of the clutch carrier.

7. The clutch carrier assembly of claim 5, wherein the formed diameter is less than a diameter of an outer surface of the clutch carrier.

8. The clutch carrier assembly of claim 1, wherein the clutch carrier includes a plurality of holes arranged for a cooling oil flow.

9. A clutch carrier assembly for a transmission, comprising:
a clutch carrier including a plurality of tabs; and
a ring gear carrier including a plurality of openings defined in an outer surface and extending therethrough, wherein:
the ring gear carrier is disposed within the clutch carrier;
each of the tabs is received within a corresponding one of the openings such that the ring gear carrier and the clutch carrier are held together; and
each of the tabs is arranged to contact a radial wall of the ring gear carrier.

10. The clutch carrier assembly of claim 9, wherein each tab includes a diameter that is less than a diameter of a radially outer surface of the clutch carrier.

11. The clutch carrier assembly of claim 9, further comprising a first axial bearing fixed on a first axial side of the ring gear carrier and a second axial bearing fixed on a second axial side, opposite the first axial side, of the ring gear carrier.

12. The clutch carrier assembly of claim 11, further comprising a radial bearing disposed radially within the ring gear carrier and supported on an inner surface of the ring gear carrier.

13. The clutch carrier assembly of claim 12, wherein the radial bearing is arranged to contact the first or the second axial bearings.

14. A method of assembling a clutch carrier for a transmission, comprising:
positioning a ring gear carrier within a clutch carrier, wherein the ring gear carrier includes a plurality of openings extending therethrough and the clutch carrier includes a plurality of formable tabs;
aligning each formable tab of the clutch carrier with one of the openings in the ring gear carrier; and
pressing each formable tab in a radially inward direction such that a portion of each formable tab is received within a corresponding one of the openings of the ring gear carrier, wherein each of the tabs is arranged to contact a radial wall of the ring gear carrier.

* * * * *